H. E. STROBHART.
PIE PAN.
APPLICATION FILED JULY 12, 1921.
1,411,128.
Patented Mar. 28, 1922.
2 SHEETS—SHEET 1.
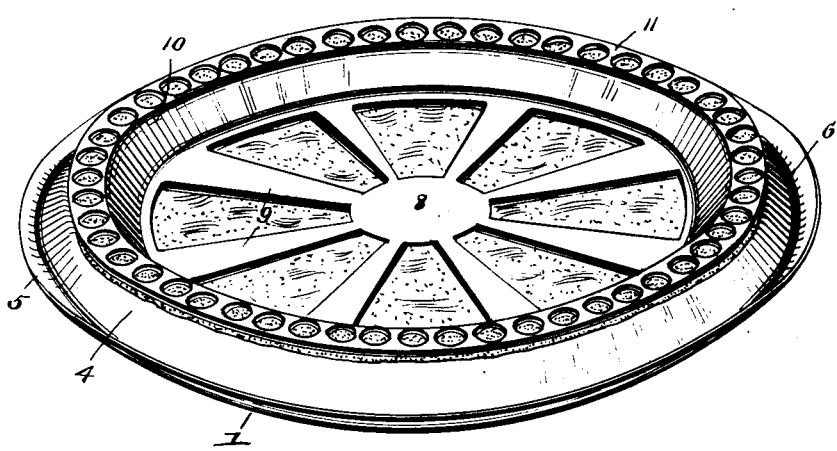
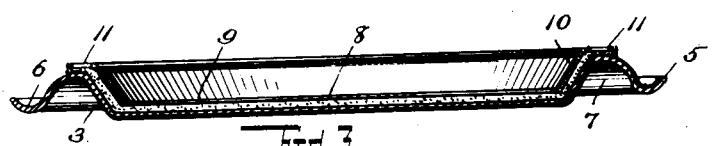
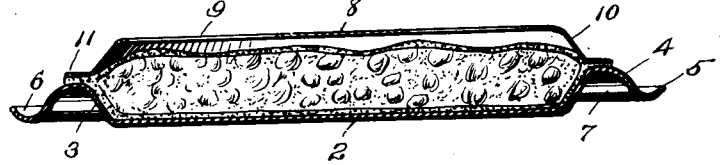
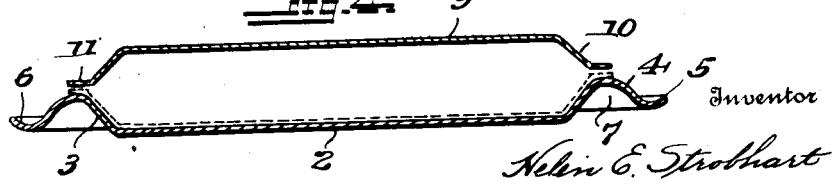
Inventor
Helen E. Strobhart
By Leugh Duffy
Attorney H. E. STROBHART.
PIE PAN.
APPLICATION FILED JULY 12, 1921.
1,411,128.
Patented Mar. 28, 1922.
2 SHEETS—SHEET 2.
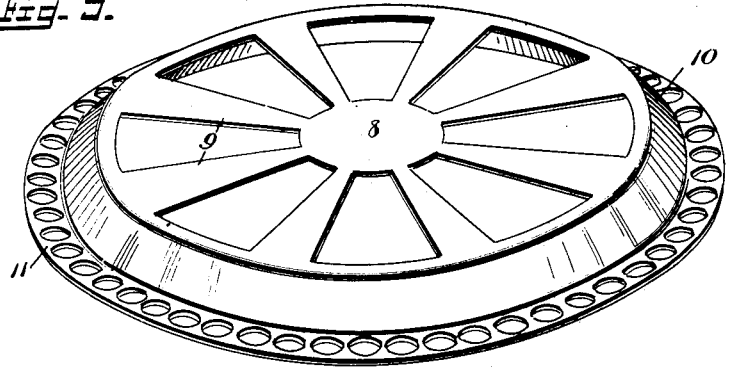
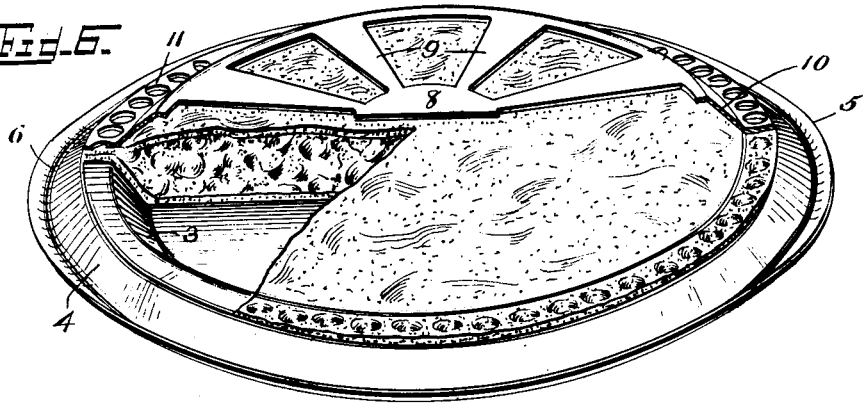
Inventor
Helen E. Strobhart,

UNITED STATES PATENT OFFICE.

HELEN E. STROBHART, OF CHICAGO, ILLINOIS.

PIE PAN.

1,411,128.

Specification of Letters Patent.  Patented Mar. 28, 1922.

Application filed July 12, 1921. Serial No. 484,038.

*To all whom it may concern:*

Be it known that I, HELEN E. STROBHART, citizen of the United States, residing at Chicago, in the county of Cook and State of Illinois, have invented certain new and useful Improvements in Pie Pans, of which the following is a specification.

This invention relates to culinary utensils, but more particularly to improvements in pie pans, and the invention has for its object to provide a construction, arrangement and combination of parts which will insure the proper baking and browning of the lower pastry of a pie, and which maintains the upper and lower pastries in proper relative position during the baking process, at the same time providing for the retention of juices by the utensil and preventing their dripping into the oven of a stove.

The invention consists of the novel construction of the pie pan, and in the construction and arrangement of the auxiliary invertible perforated member; all of which will be first fully described and afterwards specifically pointed out in the appended claims.

Referring to the accompanying drawings:

Fig. 1 is a perspective view of the pie pan and the auxiliary perforated member in one operative position thereon.

Fig. 2 is a vertical transverse sectional view through the same.

Fig. 3 is a vertical transverse sectional view through the pie pan and auxiliary invertible perforated member in inverted position.

Fig. 4 is a vertical transverse sectional view through a modification of the device and illustrating the invertible perforated member as having a solid central portion or bottom, and showing the same in its two operative positions; one in dotted and the other in full lines.

Fig. 5 is a perspective view of the auxiliary invertible perforated member in inverted position, and Fig. 6 is a perspective view of the pie pan and the auxiliary invertible perforated member, the latter being in vertical section in order to assist the illustration.

Like numerals of reference indicate the same parts throughout the several figures, in which:

1 indicates the pie pan, which has a flat bottom 2, flaring side-wall 3, depending annular skirt portion 4, and upturned annular rim 5 forming the annular trough 6.

Referring to Figs. 2 and 3, it will be seen that the depending annular skirt portion 4 terminates very slightly above the horizontal plane of the pan bottom 2; thus providing, in conjunction with the flaring side-wall 3, an annular chamber 7 for the reception and retention of heat to insure perfect baking and browning of the edge and adjacent pastry of the pie.

Referring to Figs. 1 and 2, it will be seen that the auxiliary invertible perforated member 8 may include a flat skeleton bottom 9, apertured or perforated, as for instance as shown in Fig. 1, and having a side-wall 10 in conformity to the side-wall 3 of the pie pan 1, and having a horizontal perforated annular flange 11; or said auxiliary invertible perforated member may have a flat, solid bottom or central portion 9', as, for instance, as shown in Fig. 4.

In operation, for a one crust pie, the lower pastry of the pie is positioned in the pie pan 1, and the auxiliary member 8 is placed therein, as shown in Figs. 1 and 2, and the pastry is then baked. The auxiliary member 8 holds the bottom pastry in proper position and prevents the usual shrinking and buckling of the same, while being baked without a filling; at the same time holding the edge pastry in effective position to receive the heat which is trapped and retained in the surrounding annular chamber 7. By this means a perfect pastry shell is provided for the filling, which is then applied after the member 8 has been removed.

For two crust pies, the auxiliary member 8 is inverted and is positioned over the pie, in the manner as shown in Figs. 3 and 5. In this inverted position over the pie, the bottom of the auxiliary member, whether skeleton or solid, stands clear of the central portion of the upper pastry; thereby permitting the upper crust to thoroughly bake and brown; while the perforated flange 11 is lightly pressed into the edge portion of the top pastry. This causes a fanciful configuration to be imparted to the edge of the top pastry, as the pastry enters the perforations in the flange 11, which edge pastry remains permanently figured after the baking is completed, as is shown in Fig. 6. The auxiliary member, thus inverted and positioned, effectually unites the edge portions of the two crusts, and again serves to maintain edge of the top pastry in proper position to receive the baking heat which is trapped and maintained in the surrounding annular chamber 7; while the annular trough 6 serves to collect all juices which may exude from the pie-filling during the baking process, thus protecting the oven against these drippings.

Having thus fully described the invention, I do not wish to be understood as limiting myself to the exact construction as herein set forth, as the utensil is susceptible to changes in construction, and I consider myself clearly entitled to all such changes and modifications as fall within the limit and scope of the appended claims.

What I claim as new and desire to secure by Letters Patent of the United States, is:

1. A pie pan including a main receiving member having a flaring side-wall, a depending flaring annular skirt portion and an upturned rim portion forming an annular trough, and including an annular chamber to receive and retain heat under the edge portions of the pie pastry, said chamber being formed by said depending annular skirt portion in conjunction with the flaring side-wall, and an auxiliary perforated invertible member including a skeleton bottom, a flaring side-wall and an annular perforated flange, the said auxiliary member being received within the main pie pan to maintain the lower pie pastry in proper position therein and the edge portion of the pie pastry in place to receive the heat trapped and retained in the said annular heat receiving chamber.

2. A pie pan including a main receiving member having a flaring side-wall, a depending annular skirt portion and an upturned rim portion forming an annular trough, and including an annular chamber to receive and retain heat under the edge portions of the pie pastry, said chamber being formed by said depending annular skirt portion in conjunction with the flaring side-wall, and an auxiliary invertible member including a central portion or bottom, a flaring side-wall and an annular flange, the said annular member being received within the main pie pan to maintain the lower pie pastry in proper position therein and the edge portion of the pie pastry in place to receive the heat trapped and retained in the said annular heat receiving chamber.

3. In combination with a pie-pan, an auxiliary invertible member having a central portion or bottom to conform to the bottom of a pie-pan, and having a flaring side-wall to conform to the flaring side-wall of a pie-pan and having an annular flange provided with perforations, said annular flange being adapted to project beyond the flaring side-wall of a pie-pan; the whole being invertible with respect to a pie-pan, substantially as described and for the purposes set forth.

In testimony whereof I affix my signature.

HELEN E. STROBHART.